July 11, 1967 P. W. KLIPSCH 3,330,966

LOGARITHMIC CONVERTER CIRCUIT

Filed Jan. 14, 1964

INVENTOR.
Paul W. Klipsch.
BY
Wood, Herron & Evans.
ATTORNEYS.

United States Patent Office 3,330,966
Patented July 11, 1967

3,330,966
LOGARITHMIC CONVERTER CIRCUIT
Paul W. Klipsch, Hope, Ark., assignor to Klipsch and Associates, Inc., Hope, Ark., a corporation of Arkansas
Filed Jan. 14, 1964, Ser. No. 337,565
10 Claims. (Cl. 307—43)

The present invention relates to electrical conversion circuits and is particularly directed to a logarithmic converter circuit in which the output voltage or current of the circuit is directly proportional to the logarithm of the input voltage or current.

In the past, logarithmic converters and compressors have been built using servo drives and logarithmic potential dividers, and also with non-linear circuit elements. These prior art units have been subject to many difficulties, including their complexity which not only increases their initial cost but also requires excessive maintenance of moving parts, slide wire resistors and the like. Another disadvantage of various prior art converters is that the desired linearity of output has been adversely effected by changes in frequency of the input signal. Also, many of these devices have not been effective to maintain a linear output over any extended range of amplitudes.

One object of the present invention is to provide a logarithmic converter which is effective to provide a linear output signal over an extended amplitude range, for example from zero to 20 db. The output of the present circuit also remains linear over a large frequency range of from a few cycles per second to 20,000 cycles per second.

Another object of the present invention is to provide a logarithmic converter utilizing only passive circuit elements, i.e. elements having no moving parts such as servo mechanisms and the like. Hence, the present logarithmic converter is relatively inexpensive to produce and can be operated for protracted periods with only a minimum of maintenance.

A still further object of the present invention is to provide a logarithmic converter circuit effective to indicate the average intensity of a plurality of separate inputs. This latter characteristic is particularly useful when the logarithmic circuit is employed in connection with the testing of acoustical devices, such as speakers.

Specifically, in testing loud speakers it has been recognized that speaker performance in a "normal environment" is more significant than under anechoic conditions. At the same time, however, standing wave patterns tend to develop which result in deep nulls and reduce the usefulness of recorded speaker response curves. Accordingly, it has been found desirable to test speakers in a "normal environment" by utilizing two or more spaced microphones. The present logarithmic converter circuit is effective to provide an output signal which is linear with the average of two or more microphone signals.

More particularly, in a preferred embodiment the plurality of microphone signals are amplified through separate amplifier channels and are rectified and applied to a single lead. This lead is joined to a non-linear resistance, such as one or more incandescent lamp filaments. This non-linear resistance is in turn connected to a linear resistance in series with a grounded diode shunted by a third resistance. A load resistor is joined to the juncture of the non-linear resistor and the second or series resistor. A tap on this load resistor is connected to the input of a suitable recorder, such as an X–Y recorder.

It is another important object of the present invention to provide a circuit which is slightly modified from that described which is effective to provide an output signal linear with respect to the logarithm of only the larger of two or more input signals. In this modified circuit a capacitor is connected from the input lead to the non-linear resistor to ground. I have determined that if this capacitor is sufficiently large so that the time constant of the capacitance times the lumped resistance of the remainder of the circuit is much greater than 1/50, the output signal of the converter circuit is proportional to only the stronger of the two input signals.

These and other objects and advantages of the present invention will be more readily apparent from a consideration of the following detailed description of the drawings illustrating a preferred embodiment of the invention.

Figure 1:
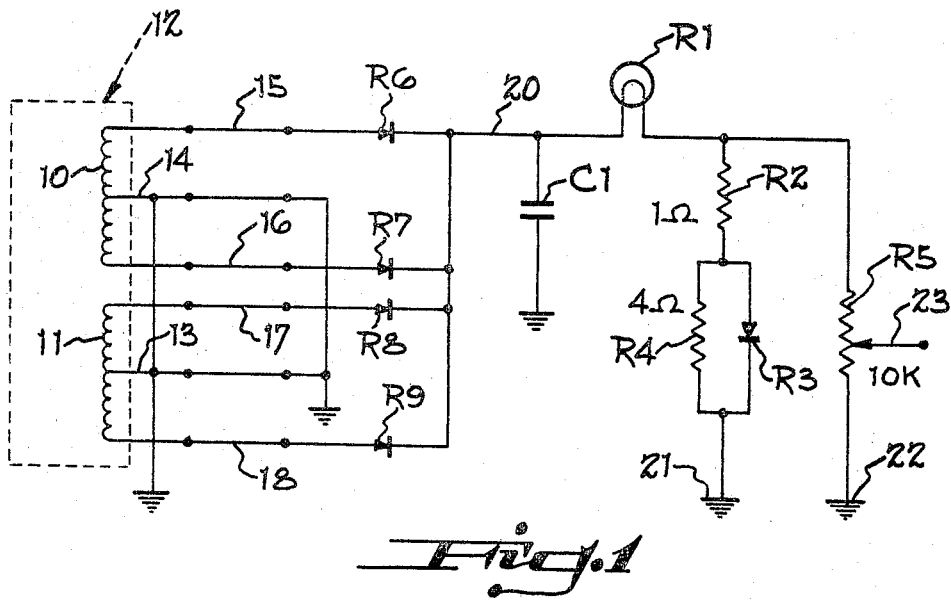
FIGURE 1 is a schematic circuit diagram showing a logarithmic converter embodying the present invention.

A preferred form of logarithmic converter circuit constructed in accordance with the principles of the present invention is shown in FIGURE 1. As there shown, windings 10 and 11 represent the secondary output windings of a two-channel audio power amplifier indicated at 12. Amplifier 12 can be any suitable type of audio power amplifier in which the center taps 13 and 14 of the output windings can be grounded. It will be readily apparent to those skilled in the art that if the output transformer secondary winding is part of a negative feedback loop of the amplifier, grounding the center tap input of one end of an amplifier will reduce the feedback 6 db permitting distortion to increase. However, since the rectified logarithmic converter is itself a high distortion device, any slight distortion in the amplifier is of no significance.

In practice, the present circuit can be employed utilizing a single pickup, such as a microphone, which provides an output signal in only one channel of the amplifier, i.e. in either winding 10 or 11. Alternatively, the system can be utilized with two or more pickups located at spaced points. If two such pickups are provided, the pickups are connected to separate channels of the amplifier so that the amplified signal from one microphone appears across winding 10 and an amplified signal from the other microphone appears across winding 11. If more than two microphones are used, additional amplifier channels are provided and the output windings of these channels are connected in the circuit in exactly the same manner as windings 10 and 11.

In the circuit shown in FIGURE 1, the end leads 15, 16, 17 and 18 of amplifier output windings 10 and 11 are respectively connected to lead 20 through rectifiers R6, R7, R8 and R9. Lead 20 is connected to a non-linear resistance designated R1. In one preferred form the resistance R1 actually comprises three incandescent lamps, such as GE 27 lamps, connected in series. Resistance R1 is connected to series resistor R2. Resistor R2 is a linear resistor and is connected in series with a diode indicated at R3. One suitable form of diode is a Sarkes-Tarzian 40–H diode. Diode R3 is grounded as indicated at 21 and is connected in parallel with a resistor R4.

The junction of resistors R1 and R2 is connected to a load resistor R5. Load resistor R5 is grounded as at 22 and the output signal from the circuit appears at tap 23 of this resistor. Suitable values for resistors R2, R4 and R5 are one ohm, four ohms and fifteen ohms respectively. It is to be understood, of course, that these values are merely exemplary. Tap 23 is connected to a suitable recorder either of the X–Y or X–T type.

In addition to the components described above, one prefered form of circuit embodying the present invention also comprises a bucket capacitor C1 connected between lead 20 and ground. This bucket capacitor is particularly useful when two input signals are being applied to lead 20 through windings 10 and 11 respectively (or more than two input signals are being applied through windings 10 and 11 and additional windings not shown). If capacitor C1 is relatively large (for example is equal to 100 μf.), so that the time constant of capacitor C1 times the lumped resistance of the remainder of the circuit is much greater than 1/60, the output signal appearing at tap 23 is proportional only to the strongest of the plurality of input signals. This is due to the fact that the capacitor C1 tends to charge up to the largest signal applied to it so that other smaller signals make no contribution to the output. If on the other hand capacitor C1 is small or is eliminated entirely, the output signal appearing at tap 23 is proportional to the average of the input signals applied to lead 20.

Figure 2:
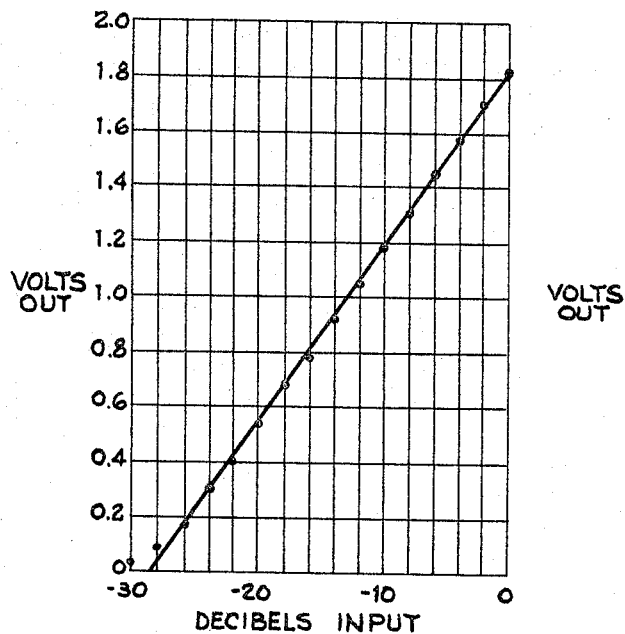
FIGURE 2 is a graph showing the relationship of output voltage to the decibel level of the input signal.

FIGURE 2 shows the relationship of the output of an actual logarithmic converter circuit of the type shown in FIGURE 1 as related to the input signal in decibels. The points on the curve were measured at two decibel steps input and volts output. The line of best fit through the points indicates errors of considerably less than a .5 decibel over more than a twenty-five decibel range.

Figure 3:
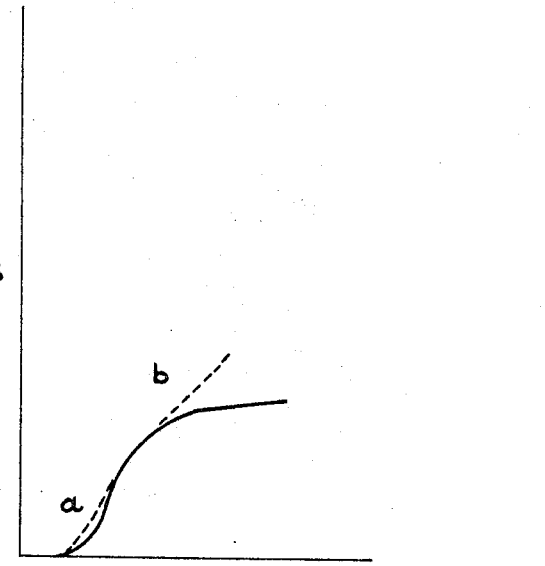
FIGURE 3 is a graph showing the qualitative response of various components of the circuit shown in FIGURE 1.

FIGURE 3 shows the manner in which the various circuit elements cooperate to provide the linear output shown in FIGURE 2. Specifically, in FIGURE 3 the solid curve indicates qualitatively the "response" of diode R3. The series connected lamps R1 pass more current when cold and hence tend to fill up the dip in the A region as indicated by the dotted line. Similarly, the series resistor R2 lifts the output in the B range so that the response in that range is more linear as indicated by the dotted line. The resistor R4 exerts a further linearizing influence on the overall circuit. In an actual test installation, frequency response of the overall system showed a drop of 2 db at the extreme range of 20,000 c.p.s. This drop coincided with the amplifier response so that the logarithmic converter circuit can be considered to be free of frequency response errors up to 20 kc.

Thermal lag in the incandescent lamps R1 causes a one decibel overshoot for large (15 db) step changes of input. When the unit is to be used for reverberation time measurements, the effects of this thermal lag and the X-Y recorder inertia must be minimized. One way of accomplishing this is by tape recording the events at 15 inches per second and playing them back at either 7.5 or 3.75 inches per second for plotting the decay on an X-Y or X-T recorder.

From the foregoing disclosure of the general principles of the present invention and the above description of a preferred embodiment, those skilled in the art will readily comprehend the various modifications to which the present invention can be susceptible. Therefore, I desire to be limited only by the scope of the following claims.

Having described my invention, I claim:

1. A device for converting an AC signal input to a DC output voltage proportional to the logarithm of the input signal, said device comprising a rectifier for rectifying said AC signal, a first non-linear resistance connected to said rectifier, said first non-linear resistance having a positive temperature-resistive coefficient, a second non-linear resistance in series circuit relationship with said first resistance, said second resistance exhibiting a curve of output voltage vs. the logarithm of voltage which is convex upwards, and linear resistance means in circuit connection with said first and second non-linear resistance for substantially linearizing the output voltage with respect to the logarithm of the AC signal input.

2. A device for converting an AC signal input to a DC output voltage proportional to the logarithm of the input signal, said device comprising a rectifier for rectifying said AC signal, a first non-linear resistance connected to said rectifier, said first non-linear resistance having a positive temperature-resistance coefficient, a second non-linear resistance in series circuit relationship with said first resistance, said second resistance comprising a diode exhibiting a curve of output voltage vs. the logarithm of voltage which is convex upwards, and linear resistance means in circuit connection with said first and second non-linear resistance for substantially linearizing the output voltage with respect to the logarithm of the AC signal input.

3. A device for converting an AC signal input to a DC output voltage proportional to the logarithm of the input signal, said device comprising a rectifier for rectifying said AC signal, a first non-linear resistance connected to said rectifier, said first non-linear resistance comprising a tungsten filament lamp having a positive temperature-resistance coefficient, a second non-linear resistance in series circuit relationship with said first resistance, said second resistance exhibiting a curve of output voltage vs. the logarithm of voltage which is convex upwards, and linear resistance means in circuit connection with said first and second non-linear resistance for substantially linearizing the output voltage with respect to the logarithm of the AC signal input.

4. A device for converting an AC signal input to a DC output voltage proportional to the logarith of the input signal, said device comprising a rectifier for rectifying said AC signal, a first non-linear resistance connected to said rectifier, said first non-linear resistance comprising a tungsten filament lamp having a positive temperature-resistance coefficient, a second non-linear resistance in series circuit relationship with said first resistance, said second resistance comprising a diode exhibiting a curve of output voltage vs. the logarithm of voltage which is convex upwards, and linear resistance means in circuit connection with said first and second non-linear resistance for substantially linearizing the output voltage with respect to the logarithm of the AC signal input.

5. A device for converting a plurality of AC input signals to a DC output voltage proportional to the logarithm of the average of said input signals, said device comprising rectifier means for rectifying said AC signals, a first non-linear resistance connected to said rectifier means, said first non-linear resistance having a positive temperature-resistive coefficient, a second non-linear resistance in series circuit relationship with said first resistance, said second resistance exhibiting a curve of output voltage vs. the logarithm of voltage which is convex upwards, and linear resistance means in circuit connection with said first and second non-linear resistance for substantially linearizing the output voltage with respect to the logarithm of the average of the AC input signals.

6. A device for producing a DC output voltage proportional to the logarithm of the largest of a plurality of AC input signals, said device comprising a rectifier means for rectifying said AC signals, circuit means responsive only to the largest of said input signals, a first non-linear resistance connected to said circuit means, said first non-linear resistance having a positive temperature-resistive coefficient, a second non-linear resistance in series circuit relationship with said first resistance, said second resistance exhibiting a curve of output voltage vs. the logarithm of voltage which is convex upwards, and linear resistance means in circuit connection with said first and second non-linear resistance for substantially linearizing the output voltage with respect to the logarithm of the largest of the AC input signals.

7. A device for producing a DC output voltage proportional to the logarithm of the largest of a plurality of input signals, said device comprising rectifier means for rectifying said AC signals, a first non-linear resistance connected to said rectifier means, a capacitor interconnecting said rectifier means to ground, said first non-linear resistance having a positive temperature-resistive coefficient, a second non-linear resistance in series circuit relationship with said first resistance, said second resistance exhibiting a curve of output voltage vs. the logarithm of voltage which is convex upwards, and linear resistance means in circuit connection with said first and second non-linear resistance for substantially linearizing the output voltage with respect to the logarithm of the largest AC signal output, the time constant of the capacitance of said capacitor times the lumped resistance of said device being greater than $\frac{1}{60}$.

8. A device for producing a DC output voltage proportional to the logarithm of an AC input signal, said device comprising a rectifier for rectifying said AC signal, a tungsten filament lamp in series with said rectifier, a first linear resistance in series with said lamp, the parallel combination of a second linear resistance and a diode in series with said first linear resistance, said diode and said second linear resistance being grounded, a load resistor shunting said first linear resistance, said second linear resistance and said diode.

9. A device for producing a DC output voltage proportional to the logarithm of the average of a plurality of AC input signals, said device comprising rectifiers for rectifying each of said AC signals, a tungsten filament lamp in series with said rectifiers, a first linear resistance in series with said lamp, the parallel combination of a second linear resistance and a diode in series with said first linear resistance, said diode and said second linear resistance being grounded, a load resistor shunting said first linear resistance, said second linear resistance and said diode.

10. A device for producing a DC output voltage proportional to the logarithm of the largest of a plurality of AC input signals, said device comprising rectifiers for rectifying each of said AC signals, a capacitor connected to said rectifiers and to ground, a tungsten filament lamp in series with said rectifier, a first linear resistance in series with said lamp, the parallel combination of a second linear resistance and a diode in series with said first linear resistance, said diode and said second linear resistance being grounded, a load resistor shunting said first linear resistance, said second linear resistance and said diode, the time constant of the capacitance of said capacitor times the lumped resistance of said circuit being greater than $\frac{1}{60}$.

References Cited
UNITED STATES PATENTS

| | | | |
|---|---|---|---|
| 2,548,913 | 4/1951 | Schreiner | 328—145 X |
| 2,663,765 | 12/1953 | De Boisblanc | 330—196 X |
| 2,995,706 | 8/1961 | Clarridge | 307—88.5 X |
| 3,037,129 | 5/1962 | Le Bel | 328—145 X |

ORIS L. RADER, *Primary Examiner.*

T. J. MADDEN, *Assistant Examiner.*